S. B. & H. J. ADAMS.
Stalk-Cutter.
No. 203,311. Patented May 7, 1878.
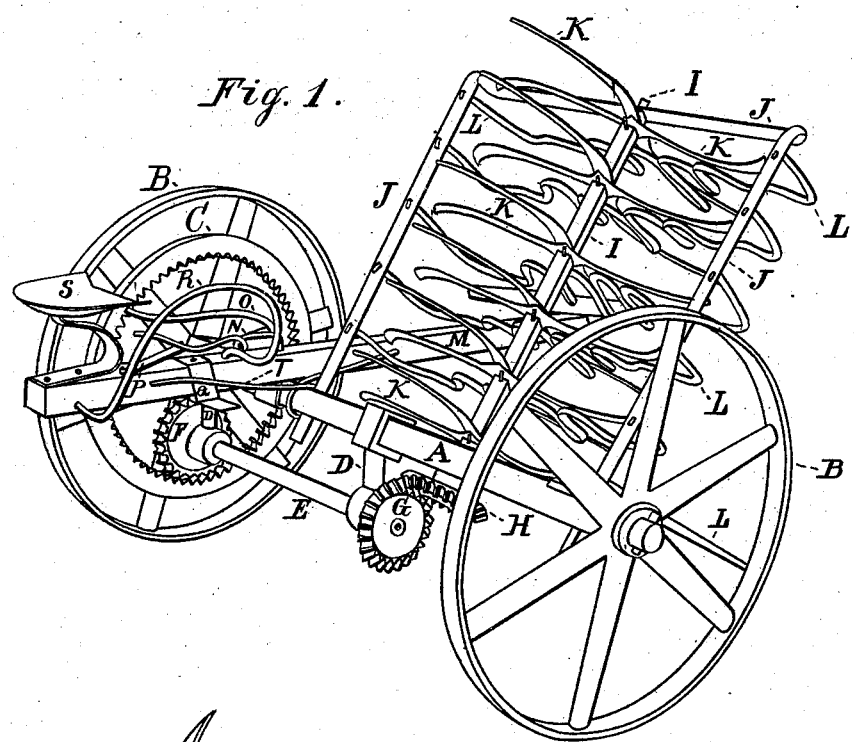
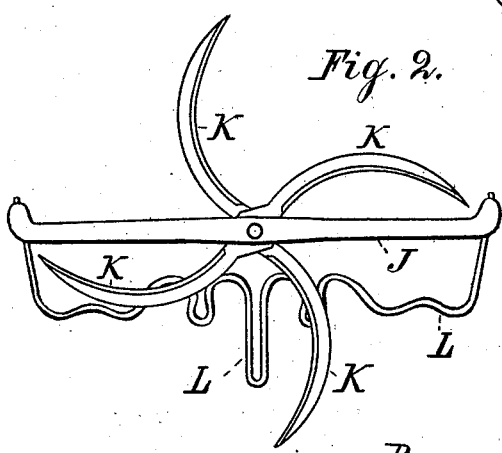
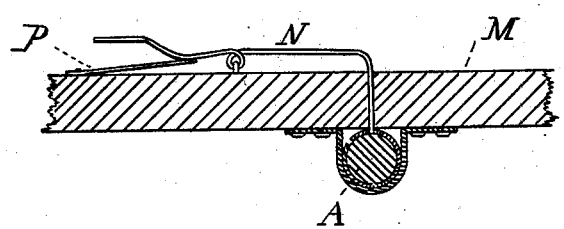
WITNESSES:
James B. Lifius,
R. P. Daggett
INVENTORS:
Stephen B. Adams,
and Henry J. Adams,
PER
C. Bradford
ATTORNEY.

UNITED STATES PATENT OFFICE.

STEPHEN B. ADAMS AND HENRY J. ADAMS, OF DUNREITH, INDIANA.

IMPROVEMENT IN STALK-CUTTERS.

Specification forming part of Letters Patent No. 203,311, dated May 7, 1878; application filed January 28, 1878.

*To all whom it may concern:*

Be it known that we, STEPHEN B. ADAMS and HENRY J. ADAMS, of Dunreith, in the county of Henry and State of Indiana, have invented certain new and useful Improvements in Stalk-Cutters, of which the following is a specification:

Reference is had to the accompanying drawings, which are made a part hereof, and on which similar letters of reference indicate similar parts.

Figure 1 is a perspective view of a machine embodying our said invention. Fig. 2 is a view of one of the knives K and the adjacent parts at the upper end of the frame J, and Fig. 3 is a detail sectional view of the connection of the tongue M to the axle A.

In said drawings, A is the main shaft or axle, which connects the wheels B B, and to which the machinery is attached. B B are the main wheels of the machine, upon which it rests and moves. C is a toothed rim or master-wheel, attached to the spokes of one of the main wheels B, and by means of which, through the spur-gear F, shaft E, and miter-gear G H, the knife-shaft I and the knives K K thereon are driven. D D are suitable bearings for the shaft E, by which it is attached to the main shaft or axle A. Surrounding the knives K K is a frame, J, attached to the shaft A, a part of which serves as one end of the frame, and to which one of the bearings of the shaft I is attached, the other bearing being upon the upper or opposite end of the frame. The sides of this frame I serve as points of attachment for the bars L, with which the stalks come in contact in the passage of the machine over the field, and which hold them in place while the knives do the cutting. The lower of these bars L may be formed with longer and wider spreading ends than the others, in order that it may serve to draw into the knives loose and leaning stalks that would otherwise escape them. It is obvious, however, that such changes in length and form may be made in these bars as experience shall show to be best, or as may be desired. They are all preferably provided with several projections or irregularities, so as to divide the stalks, in order that they may be brought separately under the action of the knives, and thus do the work with comparatively small power.

The frame I is preferably set with the top leaning forward, so that no stalks shall escape being cut up by reason of being severed near the ground and falling over before the upper knives can reach them. The leaning position also assists to more evenly distribute the work of the knives in cutting. The angle to which this frame shall incline may be varied. The tongue M, by which the machine is drawn, and upon which the driver's seat S is located, is attached to the axle A by a circular bearing, upon which it moves freely when not fastened. The shaft A, which preferably has a metal covering at this point when not constructed of metal, has a number of holes provided therein, which are located directly under a similar hole in the tongue M. A pin, N, preferably provided with a lever-like handle, passes through the hole in the shaft and engages with one of the holes in the shaft. The lever-handle to the pin we usually make of sufficient length to reach nearly to the driver's seat, passing it over a hinged fulcrum, *n*, and resting its rear end upon a spring, P, which keeps the pin engaged in its place. By pressing down upon this lever the driver can force the pin from its place, and thus release the shaft, and by properly operating the lever O he may turn the shaft, and thus raise or lower the frame, which may be again secured in the desired position by allowing the pin to enter the proper hole in the axle A.

The saddle-shaped bar Q is for the convenience of the driver in placing his feet. The safety-rail R is for his use in steadying himself in passing over rough ground, and to assist him to avoid the danger of being thrown off when any sudden jolt occurs. S is the driver's seat, which is located far enough in the rear of the axle A that his weight may serve to counterbalance that of the frame and knives, so far as may be necessary. T T are braces to the tongue M, the use of which is obvious.

The object of our invention is to produce a machine that shall cut down the standing stalks in a corn or other similar field, and reduce them to a degree of fineness that will admit of their being plowed under, or in some way worked into the ground, and thus becoming useful as a fertilizer. The great waste of burning these stalks, which has heretofore been the most common method of disposing of them, is well known to all skillful farmers.

The machine just described is well adapted to accomplish the purpose. In operation it is simply driven over the field after the corn has been gathered. The main wheels are intended to be moderate in size, so that the lower of the knives shall run near the ground, while the upper ones are intended to reach nearly or quite to the top of the stalks, and thus operate to cut up the entire length.

The knives we intend to have of sufficient length to cut two rows of stalks at once. Three feet for each knife from the shaft I outwardly, or six feet in the extreme, we consider about the proper length. The machine should be so driven that the shaft I will pass centrally between the rows, in order that the knives may reach each row alike, to obtain the best results from the large machines; but smaller machines may be built with which only one row can be cut at a time, which should be driven closely to the row which is being cut.

Having thus fully described our invention, what we claim as new, and desire to secure by Letters Patent, is—

1. In combination with the inclined shaft I and the knives K of a stalk-cutter, the series of cutter-bars L, having projections formed to divide the stalks into several portions, substantially as herein shown and specified.

2. The combination of the shaft A, having a circular bearing provided with several holes, with the tongue M, having a similar hole, the lever-pin $n$, and the spring P, all substantially as shown, and for the purpose specified.

3. The combination of the master-wheel C, pinion F, shaft E, gear G H, shaft I, sets of knives K K, cutter-bars L L, and frame J, all suitably mounted on wheels, and forming a stalk-cutting machine, substantially as herein shown and specified.

In witness whereof we have hereunto set our hands and seals at Indianapolis, Indiana, this 21st day of January, A. D. 1878.

STEPHEN B. ADAMS. [L. S.]
HENRY J. ADAMS. [L. S.]

In presence of—
C. BRADFORD,
B. G. BIRNEY.